(12) United States Patent
Sivananainthaperumal et al.

(10) Patent No.: US 11,954,373 B2
(45) Date of Patent: Apr. 9, 2024

(54) DATA STRUCTURE STORAGE AND DATA MANAGEMENT

(71) Applicant: NetApp Inc., San Jose, CA (US)

(72) Inventors: Anusha Sivananainthaperumal, Sunnyvale, CA (US); Giridhar Appaji Nag Yasa, Sunnyvale, CA (US); Ajay Vijay Bakre, Sunnyvale, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 17/717,487

(22) Filed: Apr. 11, 2022

(65) Prior Publication Data

US 2022/0236925 A1 Jul. 28, 2022

Related U.S. Application Data

(63) Continuation of application No. 16/584,124, filed on Sep. 26, 2019, now Pat. No. 11,301,177, which is a continuation of application No. 15/078,929, filed on Mar. 23, 2016, now Pat. No. 10,503,445.

(60) Provisional application No. 62/136,919, filed on Mar. 23, 2015.

(51) Int. Cl.
*G06F 3/06* (2006.01)
*G06F 11/10* (2006.01)

(52) U.S. Cl.
CPC .......... *G06F 3/0685* (2013.01); *G06F 3/0619* (2013.01); *G06F 3/064* (2013.01); *G06F 3/0644* (2013.01); *G06F 3/067* (2013.01); *G06F 11/10* (2013.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | |
|---|---|---|---|
| 7,783,598 B1 | 8/2010 | Malaiyandi et al. | |
| 8,250,040 B2 | 8/2012 | Murphy et al. | |
| 8,478,731 B1 * | 7/2013 | Throop | G06F 16/1744 707/693 |
| 8,935,493 B1 * | 1/2015 | Dolan | G06F 3/0649 711/161 |
| 9,047,017 B1 * | 6/2015 | Dolan | G06F 3/0683 |
| 9,069,783 B1 | 6/2015 | Bono | |
| 9,122,588 B1 | 9/2015 | Mondal et al. | |
| 9,507,887 B1 * | 11/2016 | Wang | G06F 3/0685 |
| 9,547,553 B1 | 1/2017 | Khermosh et al. | |

(Continued)

*Primary Examiner* — Hung D Le
(74) *Attorney, Agent, or Firm* — Cooper Legal Group, LLC

(57) ABSTRACT

The instant disclosure provides a data structure store system and a method of managing data in the store. The method includes receiving, by a data structure store management system, a request for storing data from a client. In the created data structure, each data element includes a portion of the data. On receiving a read request for at least part of the data, the data structure store management system provides at least part of the data to a recipient device. The data elements are stored in persistent memory in the form of one or more non-volatile random access devices, wherein during a time interval between receiving the storing request and providing the at least part of the data by the data structure store management system to the recipient device, the data structure store management system provides no portion of the data for writing to a hard disk drive.

22 Claims, 16 Drawing Sheets

(56) References Cited

U.S. PATENT DOCUMENTS

| | | |
|---|---|---|
| 9,594,514 B1 * | 3/2017 | Bono .................... G06F 3/0679 |
| 9,740,426 B2 | 8/2017 | Lee-Baron et al. |
| 9,811,285 B1 | 11/2017 | Karamcheti et al. |
| 9,842,660 B1 | 12/2017 | Karamcheti et al. |
| 10,503,445 B2 | 12/2019 | Sivananainthaperumal et al. |
| 11,301,177 B2 | 4/2022 | Sivananainthaperumal et al. |
| 2005/0021900 A1 | 1/2005 | Okuyama et al. |
| 2008/0071818 A1 * | 3/2008 | Apanowicz ............. H03M 7/30 |
| 2009/0327842 A1 | 12/2009 | Liu et al. |
| 2010/0070729 A1 | 3/2010 | Ng et al. |
| 2011/0078277 A1 | 3/2011 | Baptist |
| 2012/0096059 A1 | 4/2012 | Shimizu et al. |
| 2012/0191900 A1 | 7/2012 | Kunimatsu et al. |
| 2013/0275653 A1 * | 10/2013 | Ranade ................. G06F 3/0605 |
| | | 711/E12.019 |
| 2013/0290619 A1 | 10/2013 | Knight |
| 2013/0297880 A1 | 11/2013 | Flynn |
| 2013/0318283 A1 | 11/2013 | Small et al. |
| 2014/0068182 A1 | 3/2014 | Terry |
| 2014/0188819 A1 * | 7/2014 | Bagal ................. G06F 16/1734 |
| | | 707/692 |
| 2014/0188953 A1 * | 7/2014 | Lin ....................... G06F 16/183 |
| | | 707/827 |
| 2014/0279961 A1 * | 9/2014 | Schreter ............... G06F 3/0673 |
| | | 707/693 |
| 2014/0279963 A1 * | 9/2014 | Schreter ................. G06F 16/23 |
| | | 707/693 |
| 2014/0351526 A1 * | 11/2014 | Peterson ............. G06F 13/1652 |
| | | 711/149 |
| 2015/0186051 A1 * | 7/2015 | Gurajada ............. G06F 3/0611 |
| | | 711/113 |
| 2015/0237138 A1 | 8/2015 | Malina et al. |
| 2015/0269045 A1 | 9/2015 | Riedle et al. |
| 2015/0269071 A1 | 9/2015 | Zhou et al. |
| 2015/0331774 A1 | 11/2015 | Slik et al. |
| 2015/0331806 A1 | 11/2015 | Mondal et al. |
| 2016/0011803 A1 * | 1/2016 | Guo .................... G06F 3/0611 |
| | | 711/114 |
| 2016/0085696 A1 * | 3/2016 | Chiu .................... G06F 3/0647 |
| | | 711/164 |
| 2016/0147447 A1 * | 5/2016 | Blanco ................... G06F 16/28 |
| | | 711/154 |
| 2016/0188212 A1 * | 6/2016 | Camp ................. G06F 12/0246 |
| | | 711/171 |
| 2016/0188407 A1 | 6/2016 | Bronnikov et al. |

\* cited by examiner

DATA STRUCTURE STORAGE AND DATA MANAGEMENT

CROSS REFERENCE TO RELATED APPLICATIONS

This application claims priority to and is a continuation of U.S. application Ser. No. 16/584,124, filed Sep. 26, 2019 and entitled "DATA STRUCTURE STORAGE AND DATA MANAGEMENT," which is a continuation of U.S. Pat. No. 10,503,445, filed Mar. 23, 2016 and entitled "DATA STRUCTURE STORAGE AND DATA MANAGEMENT," which claims priority to U.S. Provisional No. 62/136,919 filed on Mar. 23, 2015, which are incorporated herein by reference.

TECHNICAL FIELD

The present disclosure relates to storage environments to improve access to data.

BACKGROUND

In a large storage system, a central managing device manages multiple storage devices, stores received data therein, and provides the data to the clients upon their request. The storage devices are typically hard disk drives (HDDs), because of their cost efficiency and high reliability. However, the access to HDDs is relatively slow. In order to improve the performance, a storage systems may also include one or more cache memory devices, wherein data is stored temporarily, e.g. before it is written to an HDD or after it is read from an HDD to be sent to the client. The cache devices may store copies of data objects that are often requested by the clients, so that a client is provided with a cached copy of an object permanently stored in HDDs. Caching accelerates access to the previously cached data, though requires synchronization with the permanent storage.

The data is stored in an HDD in logical blocks. The size of a single block is defined by the size of a sector in an HDD. Older hard drives have 512-byte sectors, and recent hard drives-4096-byte sectors. When a cache device is used for moving data objects to and from an HDD, the data objects are stored in the same block format at both devices. However, the block format is inconvenient for operations on the data, for example deduplication and other forms of data management.

BRIEF DESCRIPTION OF THE DRAWINGS

FIG. 5B is a logical view of the API exported by the Data Structure Store and used by applications.

DETAILED DESCRIPTION

Figure 1:
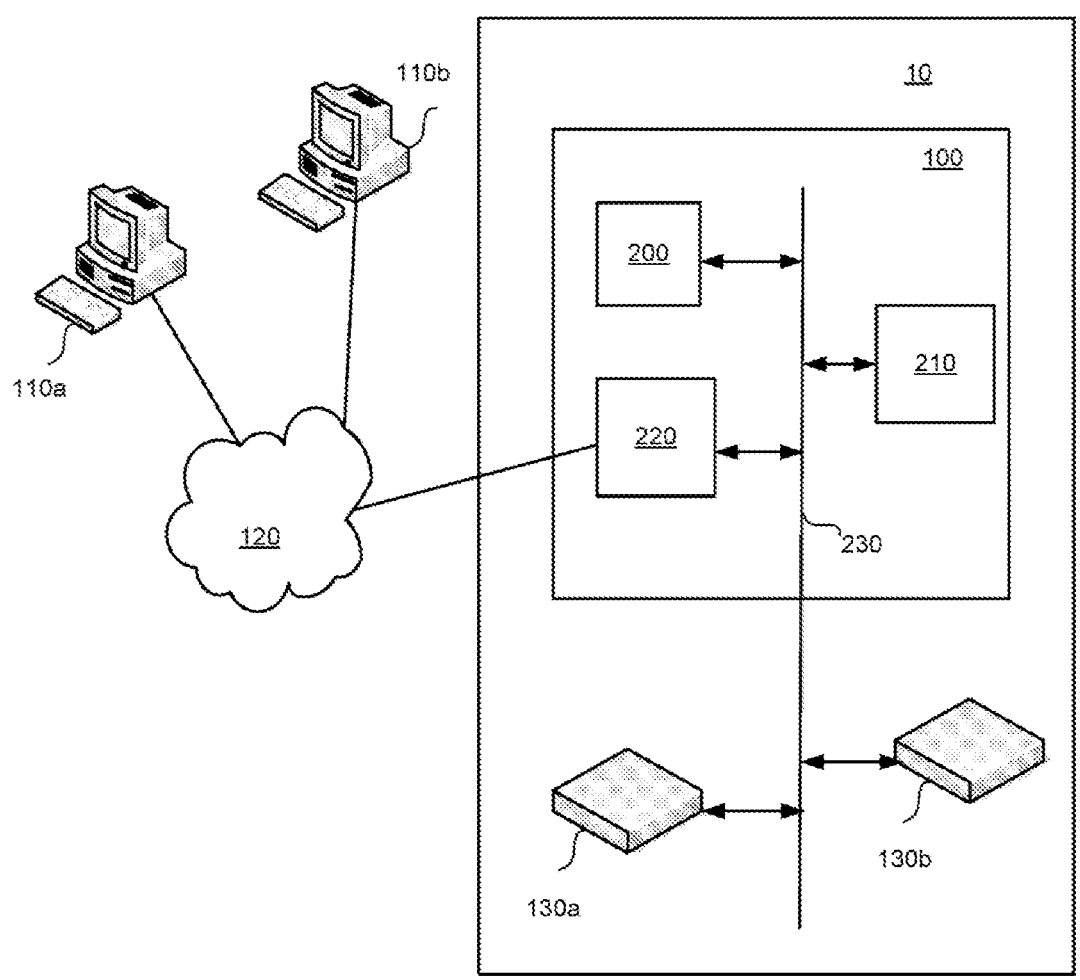
FIG. 1 is a schematic diagram of a data structure store.

A method of managing data in a data structure store system will be disclosed herein. With reference to FIG. 1, a data structure store 10 includes a data structure store management system 100 in communication with one or more storage devices 130 (130a, 130b, etc.). The data structure store management system 100 manages creating data structures, storing received data in the storage devices 130, and provides data to client computing devices 110 (110a, 110b, etc.) over a communication network 120.

The storage devices 130 are random access non-volatile memory devices. Suitable examples for the storage devices 130 include resistive switching memory cells (ReRAM) and NAND Flash. In the data structure store 10, at least some of conventional HDD storage is replaced with the non-volatile random access devices 130. The random access allows for more convenient and, in general, faster access to the stored data. For this reason, the method disclosed herein uses no HDD storage and relies on random access permanent storage. Of course, the data structure store 10 may include HDD storage; however, the method disclosed herein does not use HDDs. While HDDs are conventionally used for providing highly reliable permanent storage, the instant method stores data in the form of a data structure that helps preserving the integrity of the data when incidental memory faults occur or data is unreadable for other reasons.

The data structure store management system 100 may include a central processing unit (CPU) or processor 200, memory 210, and a communication interface 220, coupled together by a bus 230 or other link, although other configurations may be used. The system 100 may be a single device or a distributed system.

The processor 200 executes a program of stored instructions for one or more aspects of the present technology as described herein. The technology can be implemented, for example, in programmable circuitry 200 (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

The memory 210 in the data structure store management system 100 may store the instructions for one or more aspects of the present technology, although some or all of the instructions may be stored elsewhere. The memory 210 may be implemented in a random access memory (RAM), a read only memory (ROM), a floppy disk, hard disk, or other computer readable medium which may be read from by a magnetic, optical, or other reading system coupled to the processor 200 in the data structure store management system 100.

The communication interface (input/output system) 220 in the data structure store management system 100 operatively couples and enables communication with the client devices 110. By way of example only, the communications network 120 can use TCP/IP over Ethernet and industry-standard protocols, including NFS, CIFS, SOAP, XML, LDAP, and SNMP, although other types of communication protocols can be used. The connection to the storage devices 130 may be enabled by known techniques such as Peripheral Component Interconnect Express (PCI-E). In one embodiment, the storage devices 130 may be connected to the management system 100 via the bus 230.

The storage devices 130 are non-volatile random access devices (NV RAM), preferably storage class memory (SCM), which is a recent technology for persistent memory with DRAM like speeds. SCM storage does not use a battery or a super-capacitor as earlier techniques. The storage devices 130 are preferably byte-accessible devices capable of providing convenient access to elements of the data structures stored in the storage devices 130. Examples of SCM include resistive switching memory cells (ReRAM) and NAND Flash. Each of the storage devices 130 may have its own circuitry for reading and writing data on command from the management system 100.

A client device 110 may be a specialized or general purpose computer including a processor, memory, and input/output interface, coupled together by a bus or another link. A client 110 may be a mobile device, such a cell phone. The clients 110 (110a, 110b, . . . ) may run interface applications, such as Web browsers or specialized applications, to make requests for and/or send data to one or more application servers via the data structure store management computing system 100. Each of the plurality of client computing devices 110 may utilize the data structure store management system 100 to conduct one or more operations such as reading, writing, or editing data.

Figure 2:
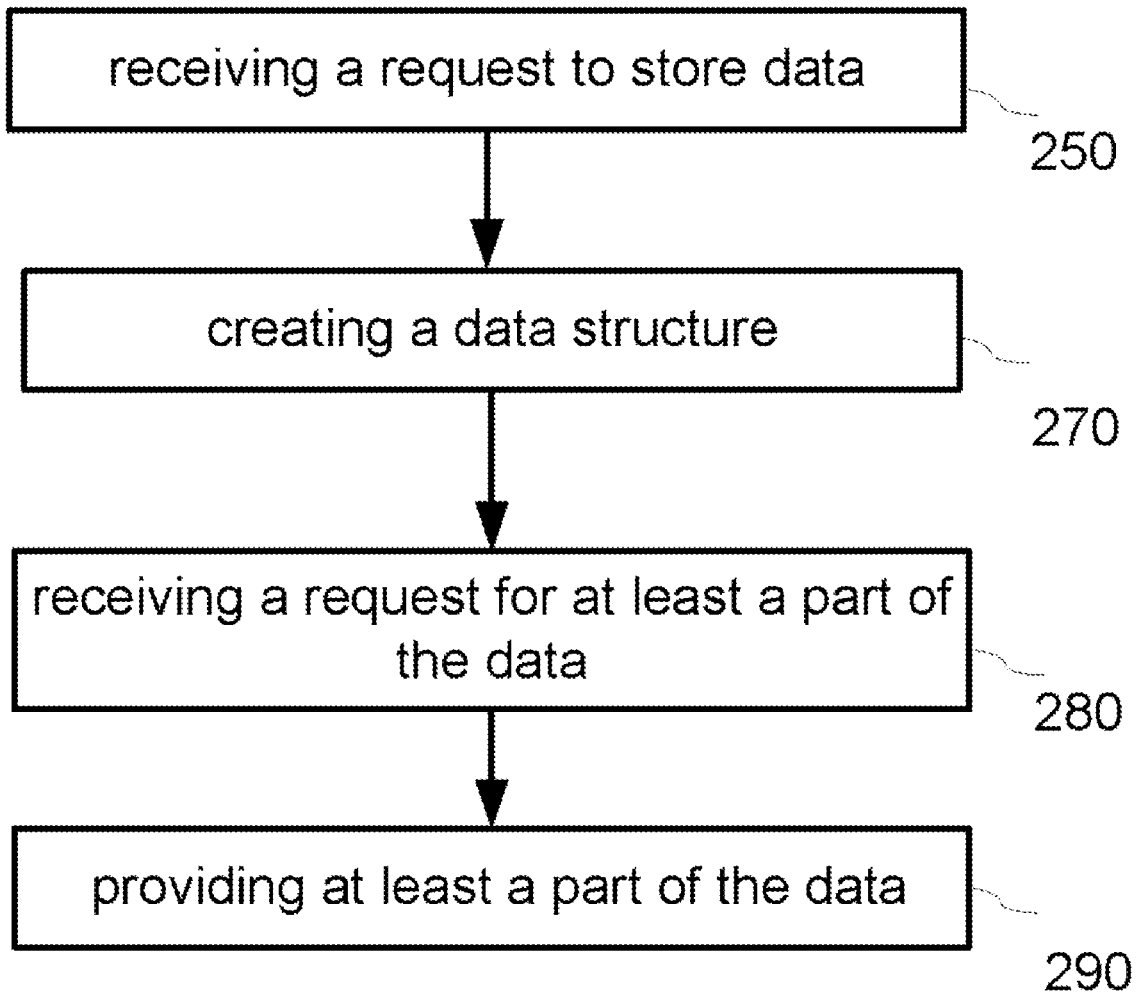
FIGS. 2 through 5 are flow charts of a method of managing a data structure store.

FIG. 2 is a flow chart of a method of data management in the data structure store 10. In operation, the data structure store management system 100 receives a request from one of the clients 110 for storing data, as illustrated in a request receiving step 250. The received request may include a request for creating a data structure, selection of the data structure type, the data itself, and reliability requirements for the storage, sent to the management system 100 together or in any combination, as it will be discussed further.

Then, in a storage step 270, the data structure store management system 100 creates a data structure wherein the received data is stored. The data may be encoded before storing. The data structure includes a plurality of data elements stored in the storage 130, each data element including a portion of the data, possibly encoded by an encoding algorithm.

In most cases, the data elements of a data structure are stored in a discontinuous memory space, in two or more separated memory regions, possibly on separate storage devices 130. In other words, at least two of data elements in a data structure are separated by physical memory or logical addresses not used for storing the particular data structure.

The data structure store management system 100 may create a meta data object for each data structure, possibly indicating locations of the data elements, their order in the data structure. The meta data object may include references from one data element to other data elements. The references may be pointers, offsets, etc. The meta data object is preferably stored within the management system 100, though it may be stored elsewhere, possibly in the storage 130. Thus, a data structure includes a plurality of data elements stored in the permanent storage 130 and a meta data object stored preferably at the data structure store management system 100.

In one embodiment, at least some of the data elements include one or more references to other data elements stored in the storage 130.

In one embodiment, the data structure store management system 100 creates multiple data structures of different types to store the received data.

In a data request step 280, the data structure store management system 100 receives a request to read at least a part of the data. The request is sent from one of the clients 110, not necessarily the same requestor that provided the data to the data structure store management system 100. Upon receiving the request, in a data providing step 290, the storage management system 100 reads the data portions from the data structure and provides at least a portion of the data to the recipient device 110 which may be identified in the request, explicitly or implicitly. Alternatively, the address or ID of the recipient device may be predefined at the data structure store management system 100. The references within the data structure or the meta data related to the data structure may be used for combining and ordering the data portions and/or for fault detection and repair as it will be discussed further, in order to maintain the integrity of the data provided to the recipient device.

The storage devices 130 are preferably non-volatile random access devices. In order to keep the convenient access to all data elements in the data structures at all times, no block-access storage devices are used for storing the data. In other words, during a time interval between receiving the data by the data structure store management computing system 100 (step 250) and providing the data by the data structure store management computing system 100 to the recipient device (step 290), the data structure store management computing system 100 provides no portion of the data for writing to a storage device that permits no random access, such as a hard drive. It should be noted that input-output buffers between the data structure store management system 100 and the persistent memory 130 are not storage devices.

Advantageously, using only random access persistent memory 130 and not using hard drives in the storage system 130 increases the performance of the data store 10, since there is no need for translating the data to and from the block format used in HDD storage. Additionally, storing data in the form of data structures increases the reliability of the storage devices 130 and helps maintaining the integrity of the data as discussed further in more detail.

Responsive to receiving the data 250, the data structure store management system 100 may select a data structure type to organize (order) the data when stored. By way of example, a stack, a queue, a linked list, a hash table, or a binary tree (B-Tree) may be selected. The selection of the data structure type may be performed by the data structure store management system 100 based on the reliability requirements, predefined at the system 100 or received from the client 110.

Figure 3:
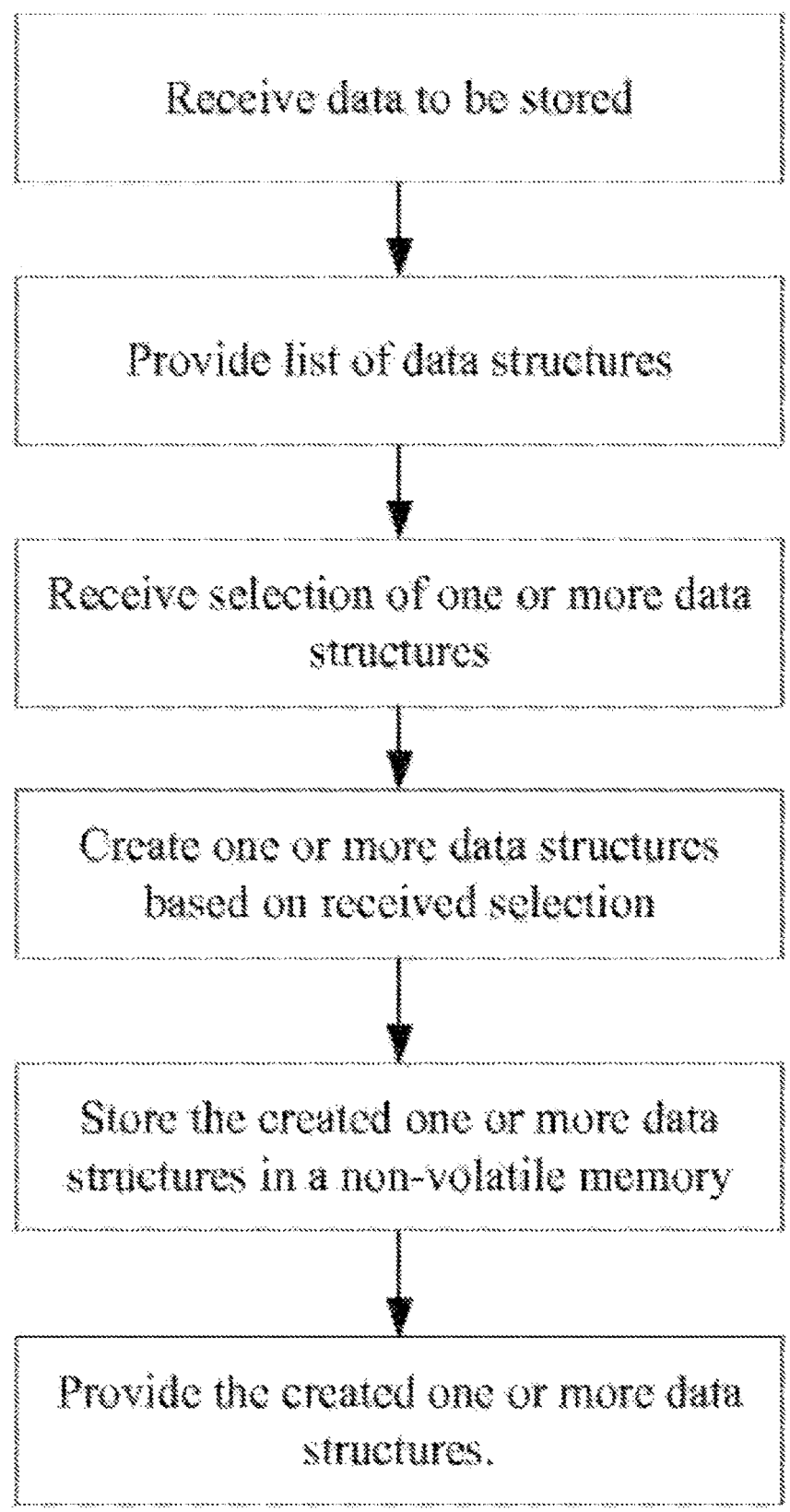

In one embodiment, the selecting of the data structure type includes providing a list of data structure types to the client 110, as illustrated in FIG. 3. The list may include such data types as stack, queue, linked list, hash table, and B-Tree. The client 110 makes a selection, and the data structure store management system 100 receives the selection from the requesting client. In another embodiment, the data structure type may be predefined at the data structure store management system 100.

Figure 4:
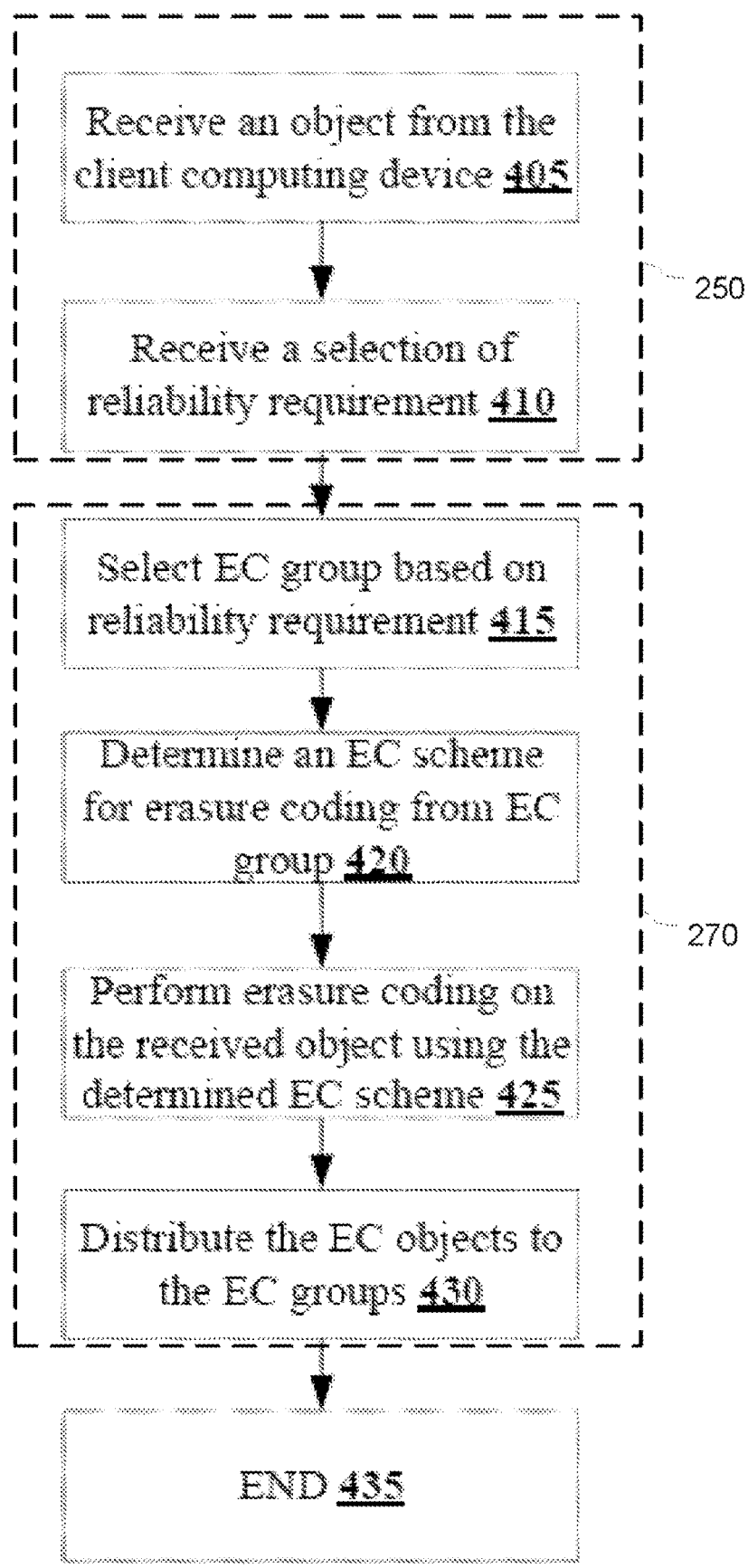

In one embodiment illustrated in FIG. 4, the request receiving step 250 (FIG. 2) includes a data receiving step 405, when the data structure store management system 100 receives data to be stored from one of the plurality of client computing devices 110. Additionally, the client 110 may send reliability requirements, so that the request receiving step 250 may include receiving reliability requirements 410. The data received at the data structure store management system 100 is then encoded using the Erasure Coding technique (EC), a technique that is more efficient than making copies because it can encode and spread data across multiple domains with less overhead than full copies in a way that retains the fault tolerance of making copies. In an erasure coding (EC) selection step 415, the data structure store management system 100 selects an EC group of storage devices 130 or memory chunks therein, possibly in response to receiving the reliability requirements from the client (step 410), or to satisfy reliability requirements predefined at the management system 100.

By way of example, the selected EC group may contain all memory chunks within the storage devices 130 that satisfy the required level of reliability requested by the client 110.

Figure 5:
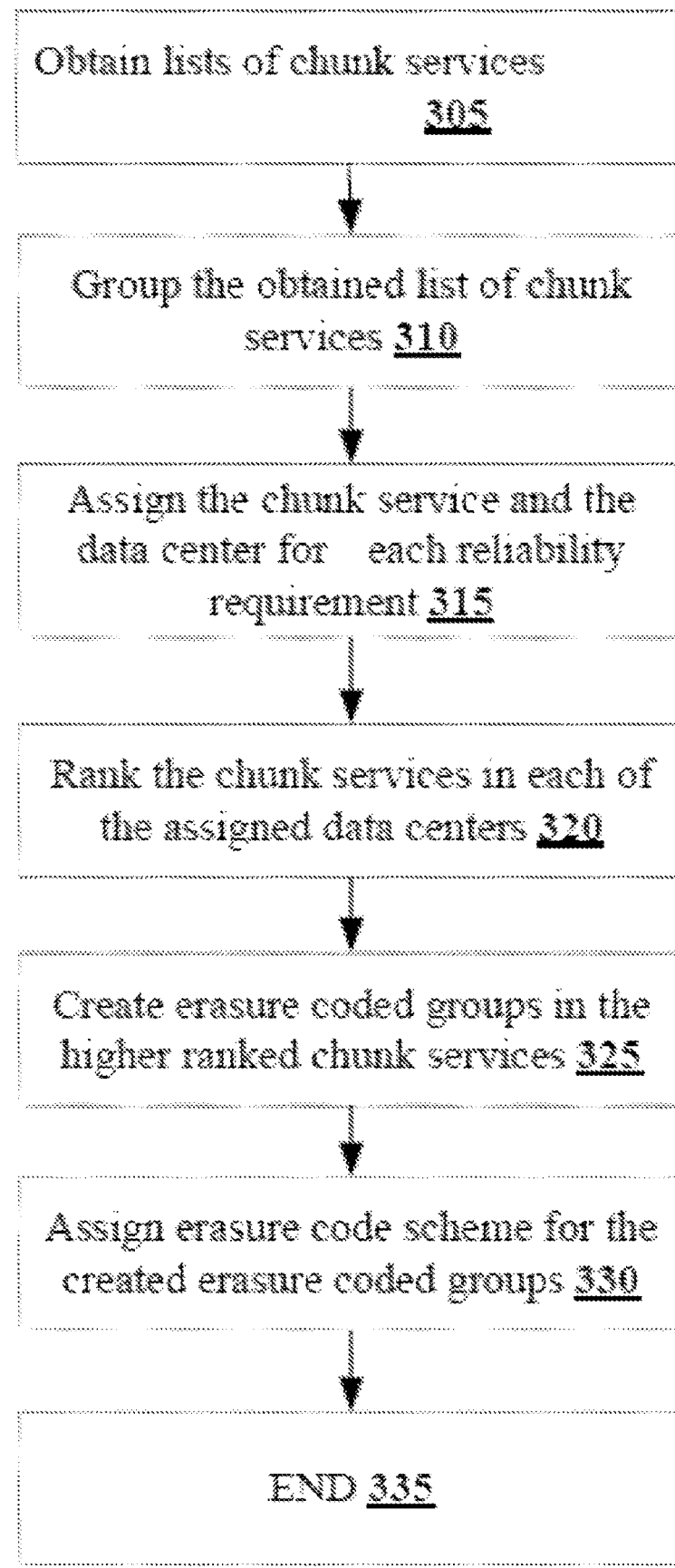

Then, in a scheme detection step 420, the parameters for the "n+k" EC erasure coding scheme may be identified, in particularly based on the size of the selected EC group. Then, in a coding step 425, the data object is broken into fragments, and in a storing step 430 the data portions together with parity information are stored across a set of different storage devices 130 in accordance with the selected EC scheme. FIG. 5 provides additional details to the embodiment described herein. More information may be found in U.S. patent application Ser. Nos. 14/696,001 and 14/614,856 incorporated herein by reference.

The metadata object may store the storage information, including identities of the storage devices 130a, 130b, etc., that store each fragment of the encoded data. When a storage device in the distributed data storage system fails, all the objects that were stored in that storage device have to be discovered and repaired, so that the reliability is not compromised.

Figure 5A:
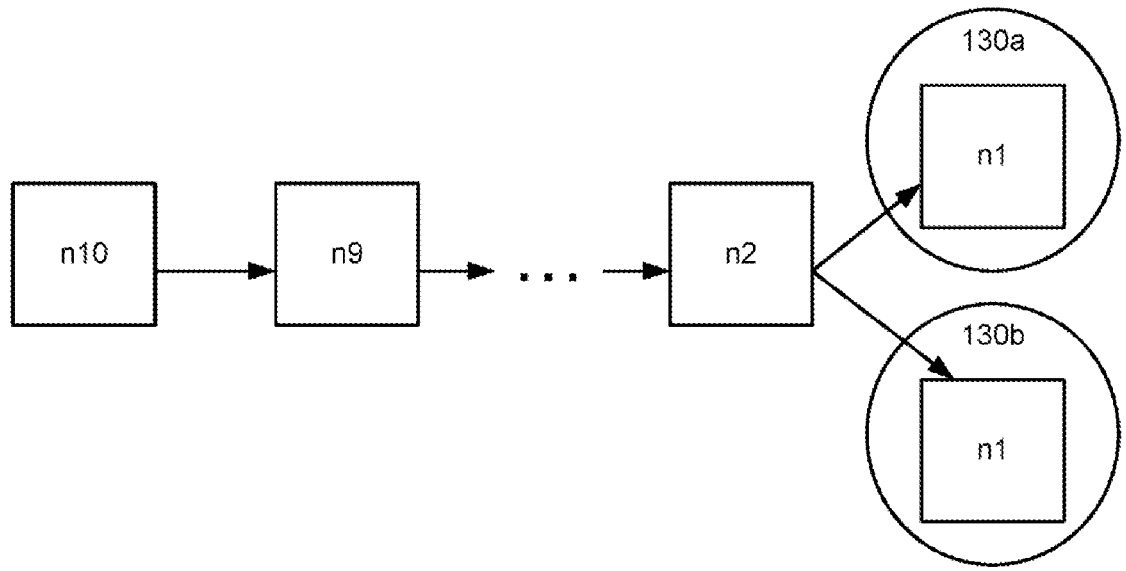
FIG. 5A is a schematic diagram illustrating an example related to erasure coding.
Figure 5:
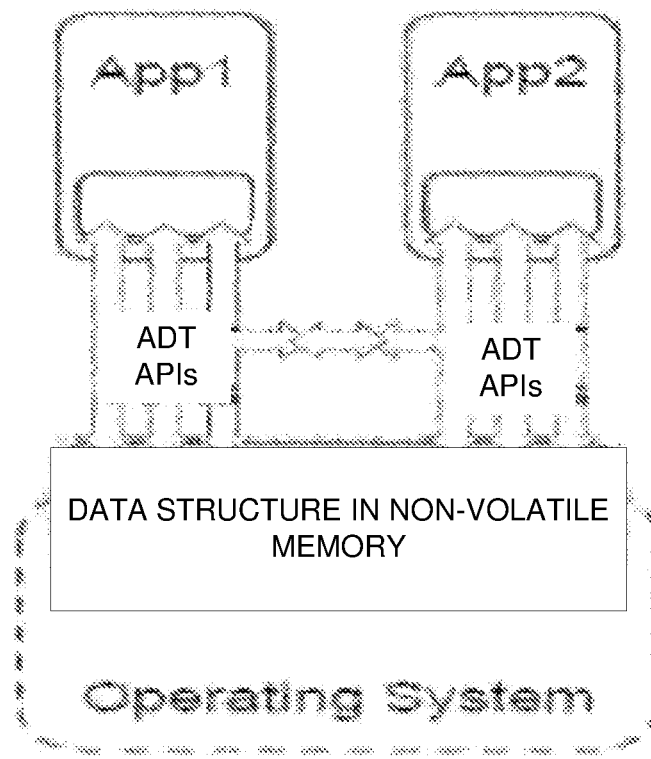

The data structure formed using EC coding as discussed above may have data elements organized in a stack or a queue. However, other data structure types may be used. By way of example, if the selected EC scheme requires N storage chunks and only N−1 chunks with the required reliability are available, the last element of the data structure may be written twice, to two chunks of lower reliability so that together they provide the required reliability and satisfy the client's request 410 (FIG. 4). In this example, the data elements in the data structure form a tree as illustrated in FIG. 5A; other data structure types may be used as well.

In one embodiment illustrated in FIG. 5, upon receiving the request to store data in the request receiving step 250 (FIG. 2), the data structure store management system 100 obtains a list of chunk services across data devices 130, in a chunk services step 305, wherein the "chunk service" (or "chunk") is a smallest portion of the storage device 130 for which the failure statistics is collected as for a single memory unit without further division into separate memory portions and statistics subsets. Then, the obtained chunk services are grouped, in a grouping step 310. In a chunk services assigning step 315, a chunk service and a storage device 130 are assigned to each reliability requirement. In a ranking step 320, the chunk services are ranked within each of one or more data centers each containing a plurality of devices 130. In an erasure coded groups step 325, the data structure store management system 100 creates erasure coded groups in the higher ranked chunk services, and during a scheme assigning step 330 an erasure code scheme, such as the "n+k" conventional scheme, is assigned to the created erasure coded groups. Next, the data structure store management computing system 100 creates the data structure based on the erasure code scheme, and stores the data in the non-volatile, preferably byte-addressable, persistent memory as illustrated in FIG. 5B.

After receiving a request for the data 280 (FIG. 2), the data structure store management system 100 provides the stored data (at least partially) to the recipient client 110, either the one that sent the request, or specified in the request, or a predefined default recipient. The information about data that may be obtained from the organization of the data in the data structure and from the metadata may be used for maintaining the integrity of the data, e.g. ordering the data portions stored within different elements of the data structure or restoring lost data. By way of example, in the described above embodiment related to EC coding, if one data element is lost due to a memory fault, the lost data portion may be restored from the remaining data elements in accordance with the erasure encoding technique.

In one embodiment, the method includes receiving, at the data structure store management system 100, a request for storing data from a client device, e.g. 110a, and receiving data from a plurality of client devices, possibly just from the client 110a (step 250). The method includes creating a data structure that includes a plurality of data elements in the persistent memory 130. Each of the data elements has a portion of the data (step 260). The data structure store management system 100 receives a request for reading at least part of the data, from a client device, possibly the client 110a or 110b (step 280). Responsive to receiving the request, the data structure store management system 100 obtains at least some of the portions of the data from the data structure and provides them to a recipient device (step 290).

Notably, the persistent memory comprises one or more non-volatile random access devices and, during a time interval between receiving the data by the data structure store management computing system 100 and providing the at least part of the data by the data structure store management computing system 100 to the recipient device, the data structure store management computing system 100 provides no portion of the data for writing to a hard disk drive.

The data structure store management system 100 may provide the data to the recipient client 110 in the form of the data structure by sending a handle to the data structure data and thus providing access to the data within the data structure. The handle may be a name, a ID number, etc. Then, the client 110 can perform (i.e. requests the manager 100 to perform) a variety of functions. By way of example, when the selected data structure type is a stack, the data structure store may provide the handle to the stack to the client 110, either after the stack is filled with data, or of an empty stack before the data is stored within the data structure. Using the handle, the client computing device 110 can push data into the stack and pop data from the stack, in the sense that the client 110 sends a request for the operation to the data structure store management system 100, which then assists in performing the push, pop, etc. operations. If no stack exists for a handle specified in an operation request from the client 110, the data structure store management system 100 can return a failure notification or create a new data structure, e.g. a new stack and then push the data. The data structure store management system 100 can ensure that each push and pop follows the last in first out (LIFO) order. In other words, the data structure store management system 100 may store data in a data structure incrementally (e.g. by push or append operations) and provide the data to the client also incrementally (e.g. pop) and just part of the stored data (e.g. search).

In one embodiment, multiple types of data structures may be created and stored in a single data structure store by the data structure store management computing system 100, and each data structure may store different types of elements. By way of example, the data structure store management system 100 may create and store the received data in a stack and B-Tree for consumption by the requesting one of the plurality of client computing devices 110. Accordingly, multiple users of the plurality of client computing devices 110 can simultaneously store and retrieve their data into the data structure store based on the access control policies.

Figure 6:
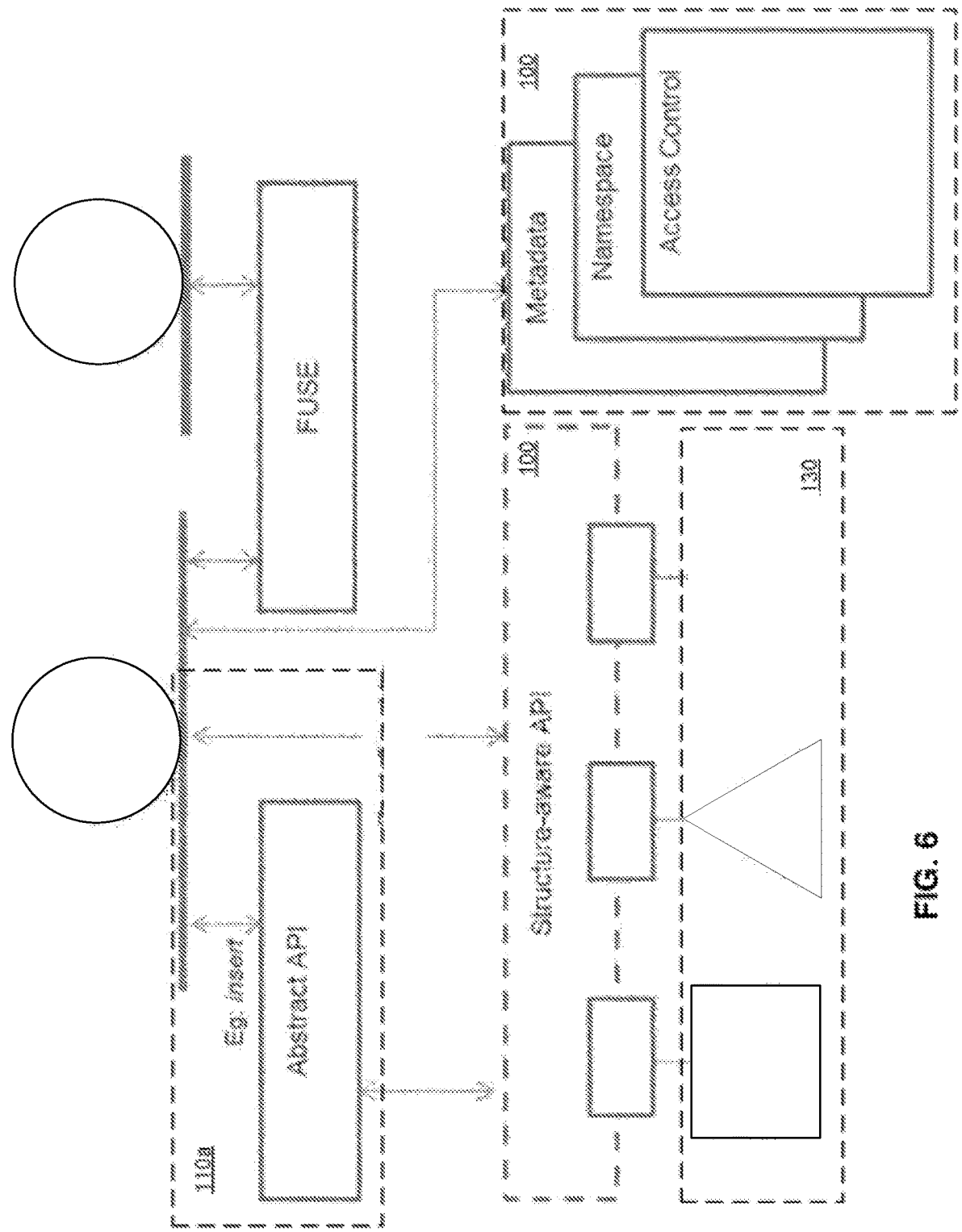
FIG. 6 is a detailed system view of using the same API by applications that are aware of data structure store in persistent memory.

The data structure store management system 100 may allow more than one of the client computing devices 110 to use or edit the information stored in the data structure using a data structure aware application programming interfaces (API). FIG. 6 illustrates the possible use of the data structure aware API. Using the API, the client 110 can create different data structures like stack, queue, linked list, hash-table, B-Tree etc. Each data structure supports operations that are semantically correct for that data structure. For example, a stack data structure supports push, pop and top operations, while a B-Tree data structure supports insert, delete and find operations. Operating on a data structure with an API that is not supported may raise a failure notification.

In one embodiment, the data structure store management computing system 100 also supports API for common data structure level operations in the created data structure. For example, reverse operation for a linked list data structure, traversal algorithms for B-Tree, graphs, etc., although other types or amounts of operations can be performed using the API. Additionally, API supports copying and moving the data between two similar or dissimilar data structures.

The data structure store management system 100 may support a minimal abstract API for common operations that are valid across all data structures. For example, insert, remove, length operations may be applicable across different data structures, such as linked list or B-Tree, although other types of data structure can also be supported by the API. Additionally, the data structure store management system 100 may support API to plugin new user-defined structures and implementation for the abstract API operations and other user defined operations on them. Furthermore, the data structure store management system 100 may support API for querying and operating on the metadata for the data structure.

The metadata in the data structure store may be of different categories. Some metadata are generic across all types of data structures, such as the type of data structure, the data type of elements stored in the data structure, access count, list of API functions supported by the data structure, etc. Some metadata are specific and applicable only for particular data structures. By way of example, the "fanout" type of metadata is used for tree data structures, a "hash function"—for a hash-table, and so on. Internal metadata are specific to data management features, e.g. the "compression algorithm" used for on infrequently used "cold" data. The metadata API supports the ability to query, set and reset these metadata attributes for a data structure.

In addition to the metadata discussed above, the API implemented at the data structure store management system 100 may support the ability to associate and disassociate user defined attributes and tags to data structures. These user defined attributes and tags can be used to group related data together. Each data structure created by the data structure store management system 100 can qualify to be part of multiple groups based the associated attributes. Furthermore, the data structure API may support looking up and searching data structures based on a specific handle, metadata attributes previously illustrated, user defined attributes and associated tags.

The data structure store API may support the ability to associate and set and reset properties that can enforce constraints on the data structure; the properties and constraints may be implemented in the way the data is stored and also be written into the metadata, e.g. for further reference when a new fragment of data arrives. For example, a linked list can be associated with append-only property, to ensure that elements can only be added at the list's tail. The API may support operations to establish ownership on a data structure. It also may allow operations to define access control, permissions and visibility of the data structure and the data within across different users of the data structure store. For backward compatibility with legacy users that still use file API, the data structure store may also support wrapper API where the data within the data structure is exposed as a byte stream or file stream. The data store API enables sharing backed up data structures among several applications by providing a common API to read such data structures from the store as long as the other applications have the right permissions to do so. The metadata store manages data structures requested by each application, location of data elements in case multiple of them have been deduplicated, etc. and also maintains access control information to make sharing possible.

By using, creating and storing data of the data structure in a non-volatile memory, the technology disclosed herein provides the variety of operations expected of the data structure, while maintaining the consistency of the data. For example, user data stored in the data structure store is persistent across restarts. Using only random access persistent memory for storing the data structures enables the convenience and efficiency of operations on the data structures, such push, pop, search, etc.

Additionally, the method disclosed herein provides protection and resilience of the data against faults. The technology efficiently manages the storage space by identifying cold, infrequently used data and compressing the identified cold data. Conventionally, data structures stored in permanent memory are mapped to byte addressable RAM by compilers when a program is compiled. The method disclosed herein enables applications to utilize non-volatile memory to request persistence of their data structures during computation while still allowing byte addressable and fast access to these data structures. The method also provides reliability characteristics desired for these data structures so these can be copied/erasure coded on external stable storage outside the fault domain of the computer application.

Figure 7:
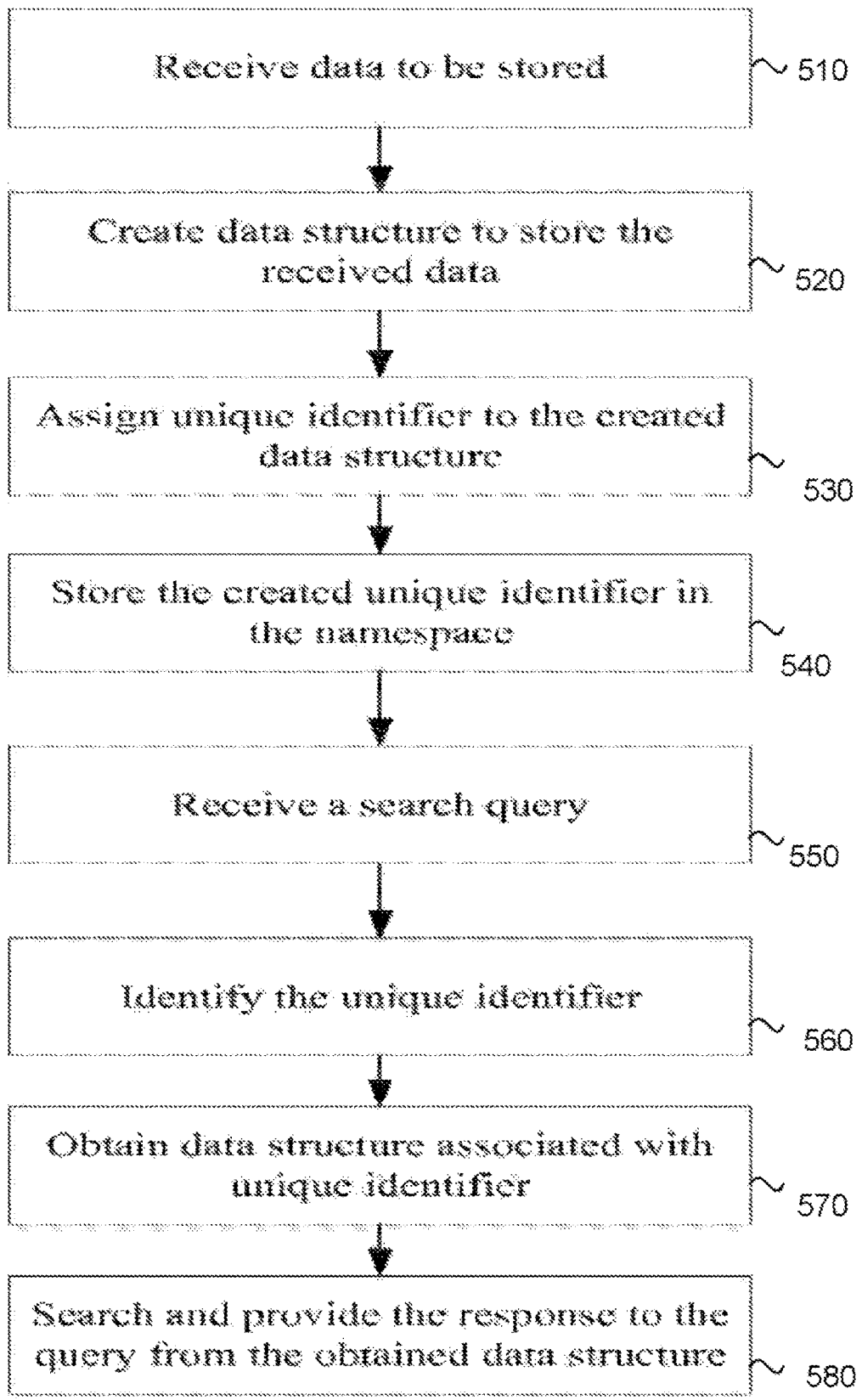
FIG. 7 is a flow chart of a method of managing a namespace.

With reference to FIG. 7, a method of managing a namespace includes receiving data that has to be stored from one of the plurality of client computing devices 110 at the data structure store management system 100, step 510. Next, the data structure store management system 100 creates a data structure to store the received data, step 520. The data structure store management system 100 can create one or more data structures to store the received data. The created data structure may have data elements organized in the form of a stack, queue, linked list, B-Tree, although other forms of data structures such as user defined data structures can be created by the data structure store management system 100. The data structure store management system 100 stores data in the data elements in a non-volatile memory 130.

Next, the data structure store management computing system 100 assigns a unique identifier to the created data structure, step 530. The unique identifier may be a numeric value, alphabets or alpha numeric value. The unique identifier may be used as a handle for the client computing devices 110 to get access to the data stored in the created data structure. The data structure store management system 100 then stores the assigned unique identifier associated with the created data structure in a namespace that maintains indexes of data structure handles based popular metadata attributes and user defined attributes and tags, step 540. Additionally, the namespace efficiently maintains the various metadata attributes and user defined attributes and tags associated with a data structure. Next, the data structure store management system 100 receives a query to search for data within the data structure from one of the plurality of client computing devices, step 550. The data structure store management system 100 then identifies the unique identifier associated with the data structure, step 560, although the data structure store management computing system can perform other types of operations in response to receiving the search query.

Figure 7A:
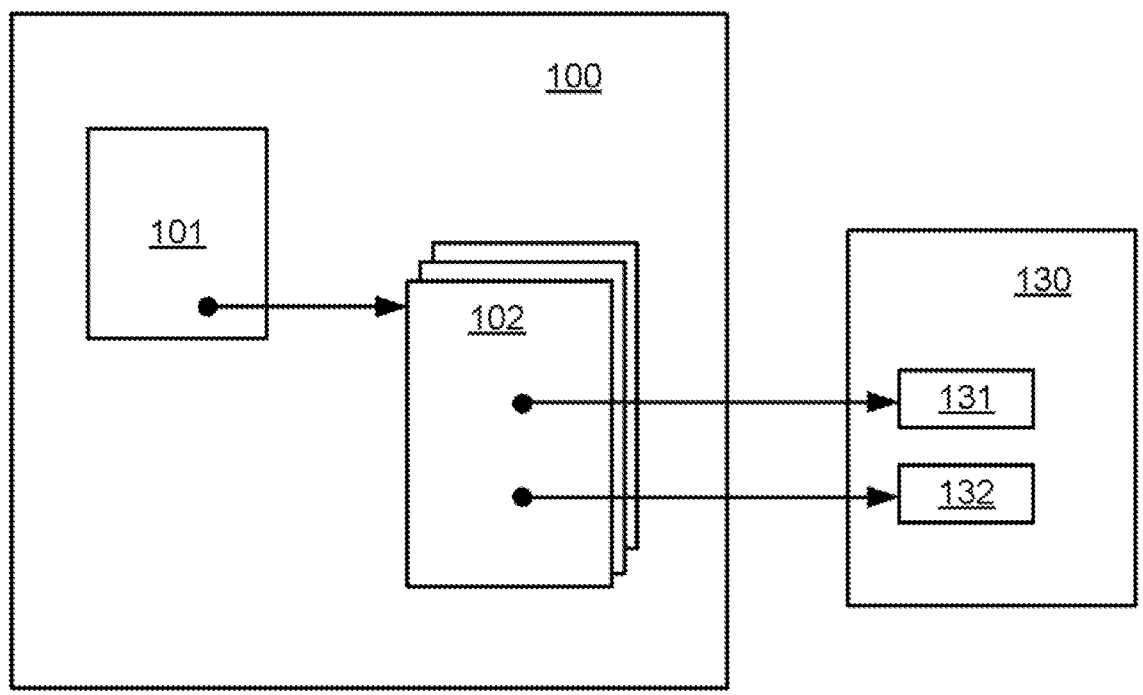
FIG. 7A is a schematic diagram illustrating the method of managing a namespace.

Next, the data structure store management system 100 obtains the data structure, in the sense obtaining a handle to the data structure, using the identified unique identifier of the data structure, step 570. Then, the data structure store management system 100 searches the information for the received query in the obtained data structure, step 580. Upon searching, the data structure store management system 100 provides the requested information back to the requesting one of the plurality of client computing devices 110, step 580, and the exemplary method ends. Instead of the search, any other operation on the data structure may be requested by the client and performed by the management system 100 using the unique identifier of the data structure as described herein. With reference to FIG. 7A, the namespace 101 provides a handle of the metadata 102 of the data structure identified by the unique identifier, and the metadata 102 may include references to data elements 131, 132, etc. stored within the permanent memory 130. The term "data structure" used in this disclosure should be understood to include data elements stored in the persistent memory and, possibly, metadata preferably stored at the management system 100, whereas the notion of providing a data structure relates to providing access to the data structure, e.g. sending a handle to a client in order to enable further operations on the data structure.

By using the namespace to store the unique identifier, the technology provides fast access to popular groups of related data and also speeds up search for data based on the metadata attributes and user defined tags. Additionally, the overhead of maintaining the index and the cost of lookup is minimal, and does not interfere with the expected time complexity and efficiency of operations on the data structure.

Figure 8:
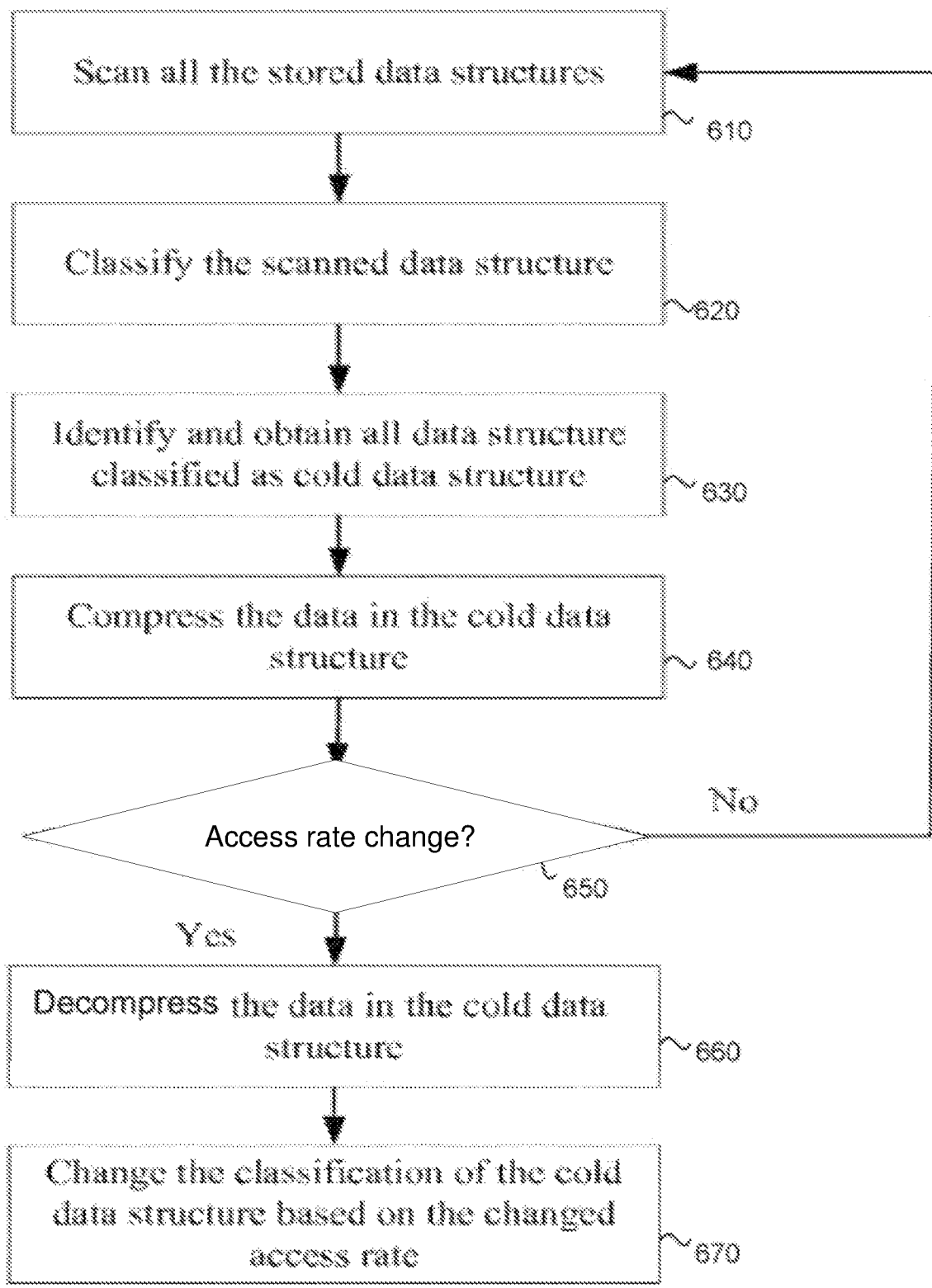
FIG. 8 is a flow chart of a method of managing storage space.
Figure 9:
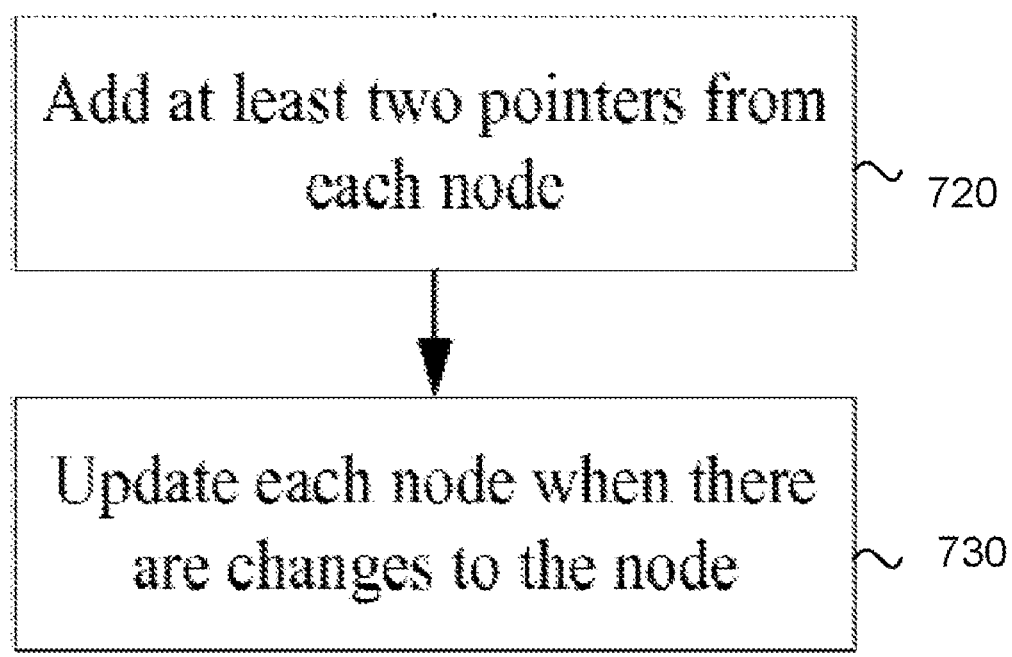
FIG. 9 is a flow chart of a fault protection method.

An exemplary method of efficiently managing storage space will now be described with reference to FIG. 8. The method includes the data structure store management system 100 scanning all the data structures with data stored within the non-volatile memory 130, step 610.

Next, the data structure store management system 100 classifies each of the scanned data structure into categories, e.g. as a hot data structure, a warm data structure or a cold, data structure, step 620. In this example, a hot data structure relates to a data structure that is frequently accessed by the plurality of client computing devices, while a cold data structure is infrequently accessed.

By way of example, the data structure store management system 100 can have predefined thresholds for the number of times when the data structure is accessed within a particular time range. Accordingly, if the number of actual accesses exceeds the upper threshold number, then the data structure store management computing system classifies the data structure as a hot data structure. Similarly, a warm data structure in this example can relate to a data structure which is accessed by the plurality of client computing devices at a number which is in the range between the upper threshold and the lower threshold. Lastly, a cold data structure in this example relates to a data structure which is accessed by the plurality of client computing devices at a number lower than the lower threshold.

In another example, hot, warm and cold data structure can relate to a type or the size of data stored in the data structure. The hot or cold category can be applied to an entire data structure or just some parts of it. By way of example, an entire stack data structure can be hot because it is often accessed; but it is also possible that another stack is only partially hot with respect to the top few elements which are more accessed than the rest of the stack.

Upon classifying, the data structure store management system 100 identifies all data structures classified in a particular predefined category, e.g. cold data structures, step 630. Next, the data structure store management system 100 compresses data stored within the identified (e.g. cold) data structures, step 640. The data structure store management system 100 may use one or more of the compression algorithms based on the type of data stored in the data structure to compress the data. By way of example, if the cold data structure is a linked list including elements of string data type, an encoding scheme or compression algorithm that works best with string, such as Huffman coding, can be used to compress the data. Alternatively, the user of client computing device 110 can select a compression algorithm to compress data in the cold data structure.

If the operations on the cold data structure are expected to be read-mostly, the data structure store management computing system 100 may convert the data within the cold data structure into a succinct version of the same data structure. By way of example, if a binary tree, or its sub-tree, has a low access count and marked read-only, then the data structure store management computing system 100 may convert the data into a succinct binary tree.

Next, the data structure store management computing system 100 continues to monitor the access rate on all the stored data structures, step 650. Accordingly, if the access rate on the data structure classified as a cold data structure is above a predefined threshold, the data structure store management system 100 decompresses the compressed data in the cold data structure, step 660. Additionally, the data structure store management system 100 may change the classification of the previously classified cold data structure, step 670. By compressing data in cold data structures, the technology disclosed herein provides advantages of efficiently managing storage space within a non-volatile memory.

In one embodiment, the data structure store management system 100 can perform deduplication of the data structures using chunk size and boundaries that are aware of hidden patterns. For example, if a linked list is to be de-duplicated, the chunking algorithm ignores the next pointers and only looks at the data.

An exemplary method for protecting data against memory faults will now be illustrated with reference to FIGS. 9-12. The data elements present within a stored data structure may be mapped to nodes in a virtual graph, e.g. a tree, wherein each node represents one of the data elements and has redundant paths to other nodes. The data structure store management computing system 100 assigns at least two additional pointers (or other types of references) to most of the nodes, step 720, with the possible exception of e.g. leaf nodes in the tree. The data structure store management system 100 can assign additional pointers based on the degree or level of fault tolerance needed and the original pointers in the data structure. By way of example, with reference to FIG. 10, the data structure store management system 100 assigns node n6 with two additional pointers to nodes n2 and n4. Further in this example, the mapping between the logical data structure and the physical storage layout may be based on the data structure and the degree or level of fault tolerance, although the logical data structure and the physical storage layout can be mapped based on other types or amounts of parameters. In this example, the technique of mapping and setting up of additional pointers depends on the data structure, although other types or amounts of criteria can be used to map additional pointers. In one embodiment, the nodes may be stored as entries in the metadata, linked to data elements. In another embodiment, there are no separate entries for the nodes, though the metadata for at least some of the data elements includes two or more references from those elements to other data elements in the data structure. 67. Next, the data structure store management computing system 100 updates the mapped elements and the at least two additional pointers whenever the nodes are updated, step 730.

Additionally in this example, each data structure can be stored in a fault tolerant version or non-fault tolerant version, although the data structure can be stored in other types of fault tolerant versions. If stored in a fault tolerant version, the underlying storage layout may be different from the non-fault tolerant version, but all the operations on the data structure and its functionality remain similar to the non-fault tolerant version. So it is transparent to the user of the client computing device. The fault tolerant version storage layout depends on the type of data structure and the degree or level of fault tolerance needed.

Figure 10:
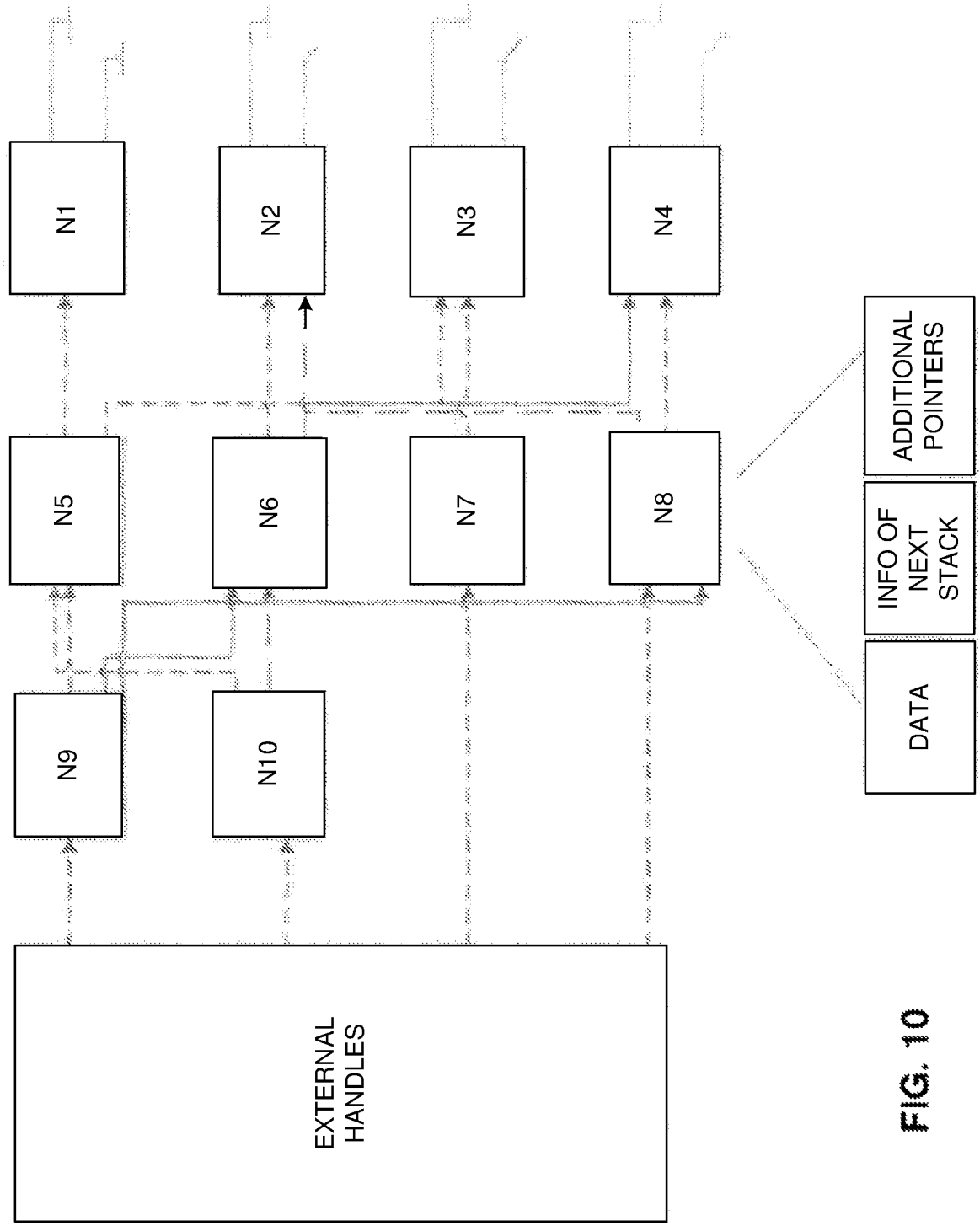
FIGS. 10 and 11 are schematic diagrams of a data structure.
Figure 11:
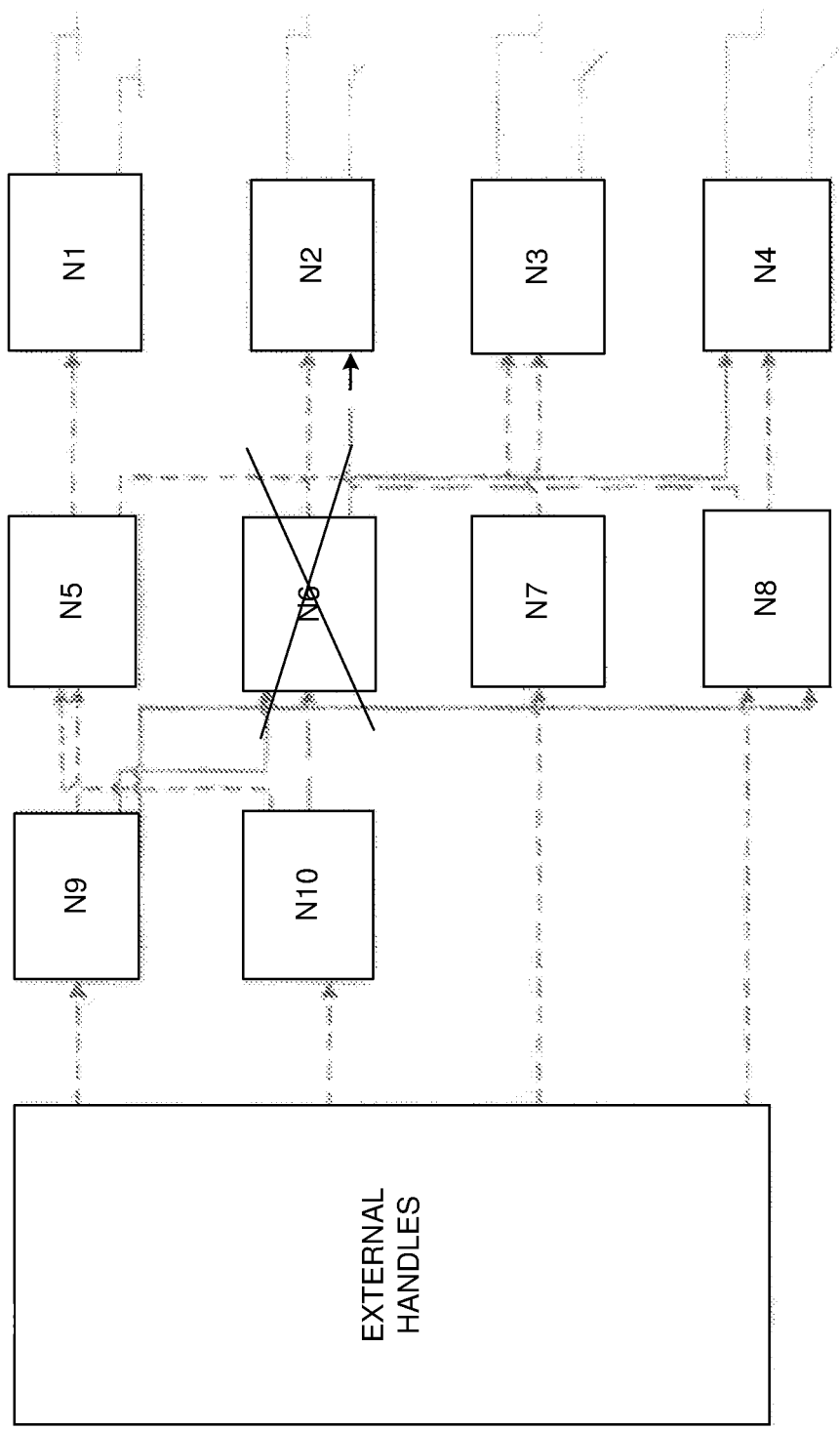

FIGS. 10 and 11 illustrate a list or stack with fault a degree of tolerance equal to 2.

Each operation on the fault tolerant version of data structure that changes the structure—e.g. create, update, and delete operations—has to perform a fixed number of additional steps to maintain the fault tolerance level at all times. Normal read operations are unaffected. When a fault occurs and is detected, and if the number of faults is within the tolerance degree or level, the rest of the data structure unaffected by the fault remains semantically valid and can still continue to be accessed normally. The faulty parts of the data structure, if recoverable, can be accessed once recovered.

Further embodiments illustrate the use of additional references for fault detection and recovery of data.

With reference to FIG. 10 the data elements of a data structure are organized in a linked list based stack n1-n10 designed to tolerate up to 2 faults. Within the data structure, each data element of the stack n1-n10 is mapped to a node in the underlying virtual graph. Most of the nodes have two additional pointers each (shown in dotted lines), in addition to a single pointer in the original stack n1-n10. Whenever an element is pushed into the stack, the push command performed by the management system 100 creates the element and adds it to the stack. The management system 100 also maps this element to an appropriate node in the graph and sets up additional pointers properly. The pointers or references of any other type may be stored together with the data portions, thus forming the data structure in the permanent memory 130. Alternatively, the references to other elements, e.g. pointers, may be stored in the metadata at the managing system 100.

In case of memory failure, when one of the data elements become unreadable, the additional pointers help to continue reading from the stack. By way of example illustrated in FIG. 11, if node n6 has failed, node n5 can still be accessed using the additional pointer associated with node n10, and reading from the stack continues. If the data has been encoded using e.g. an 'n+k' EC coding scheme as discussed above, the loss of one or more (up to k) elements of the data structure is reparable, and thus it makes sense to continue reading even if one or more data elements are corrupted.

Figure 12:
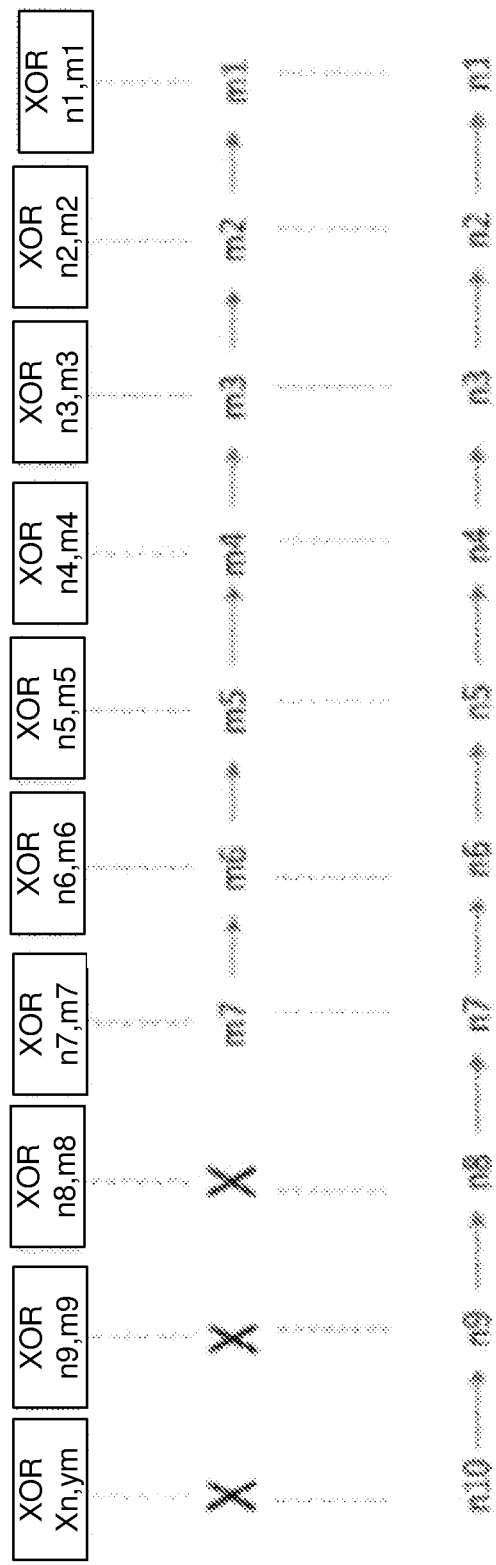
FIG. 12 is a schematic diagram illustrating an XOR operation on two linked lists.

In another method of protecting the data within the data structure, the data structure store management system 100 uses an additional data structure for every 'k' data structures of a same type. FIG. 12 provides an example of two linked lists: one n-list consisting of data elements, also referred herein as nodes, n1 to n10 and another m-list of nodes m1 to m7. The data structure store management system 100 combines the two linked lists using the XOR operation to form a new linked list x-list of nodes x1 to x10 (the top row in FIG. 12). That is, x1=n1 XOR m1, x2=n2 XOR m2, and so on. Any operation performed on the two original data structures, linked lists n and m, required an additional XOR operation in order to maintain the combined list x. That is, if m8 is added to the m list, the element x8 should be recalculated to m8 XOR x8. By using the above illustrated to protect data, if either one of three linked lists—m-list or n-list or x-list—is lost, the data structure store management system 100 will be able to reconstruct the lost data using the remaining two linked lists. Notably, any number of similar data structures may be combined using this technique: x1=n1 XOR m1 XOR p1 XOR . . . XOR z1, etc. However, the recovery is possible only in case of losing a single data structure.

Figure 13:
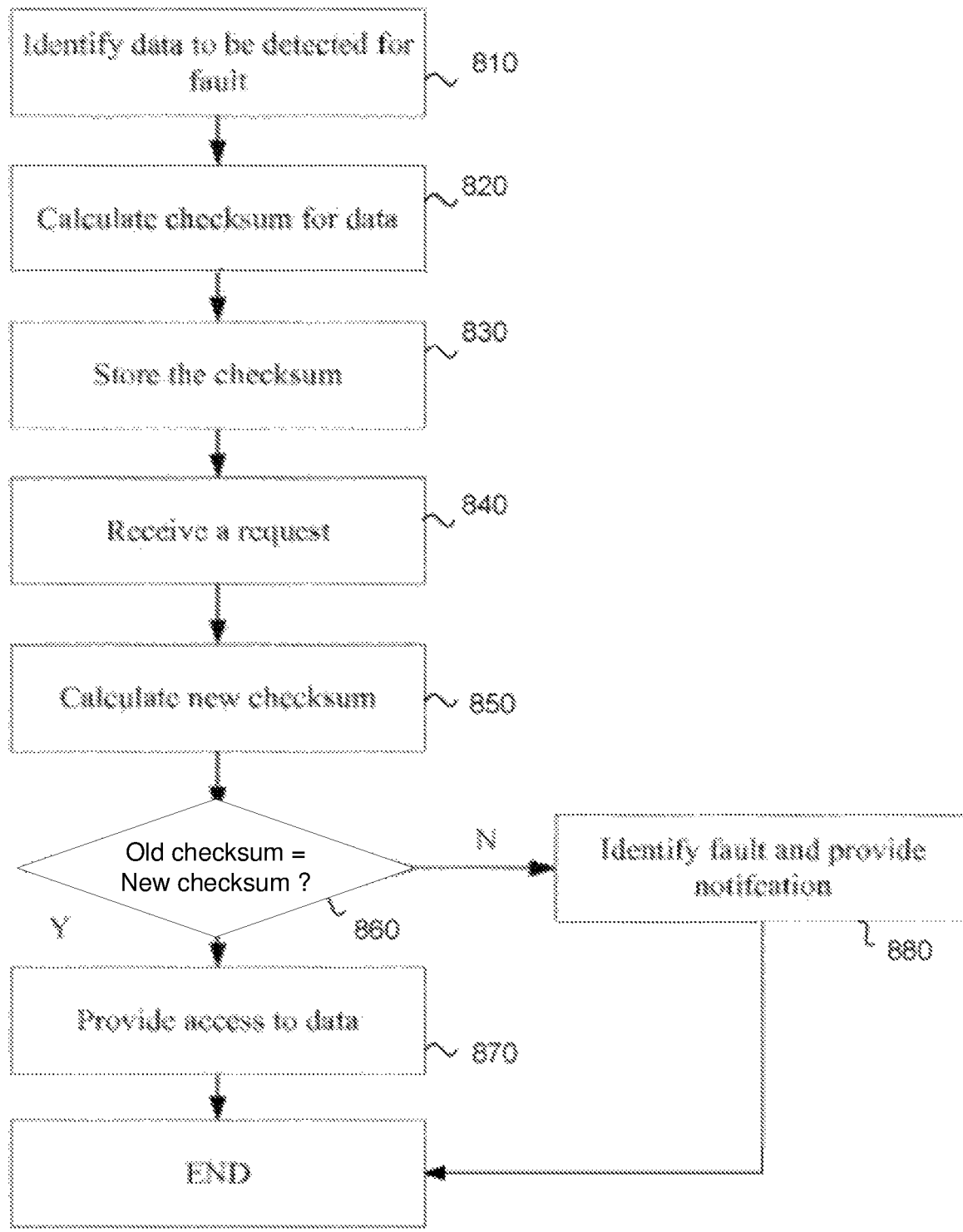
FIG. 13 is a flow chart of a method.
Figure 14:
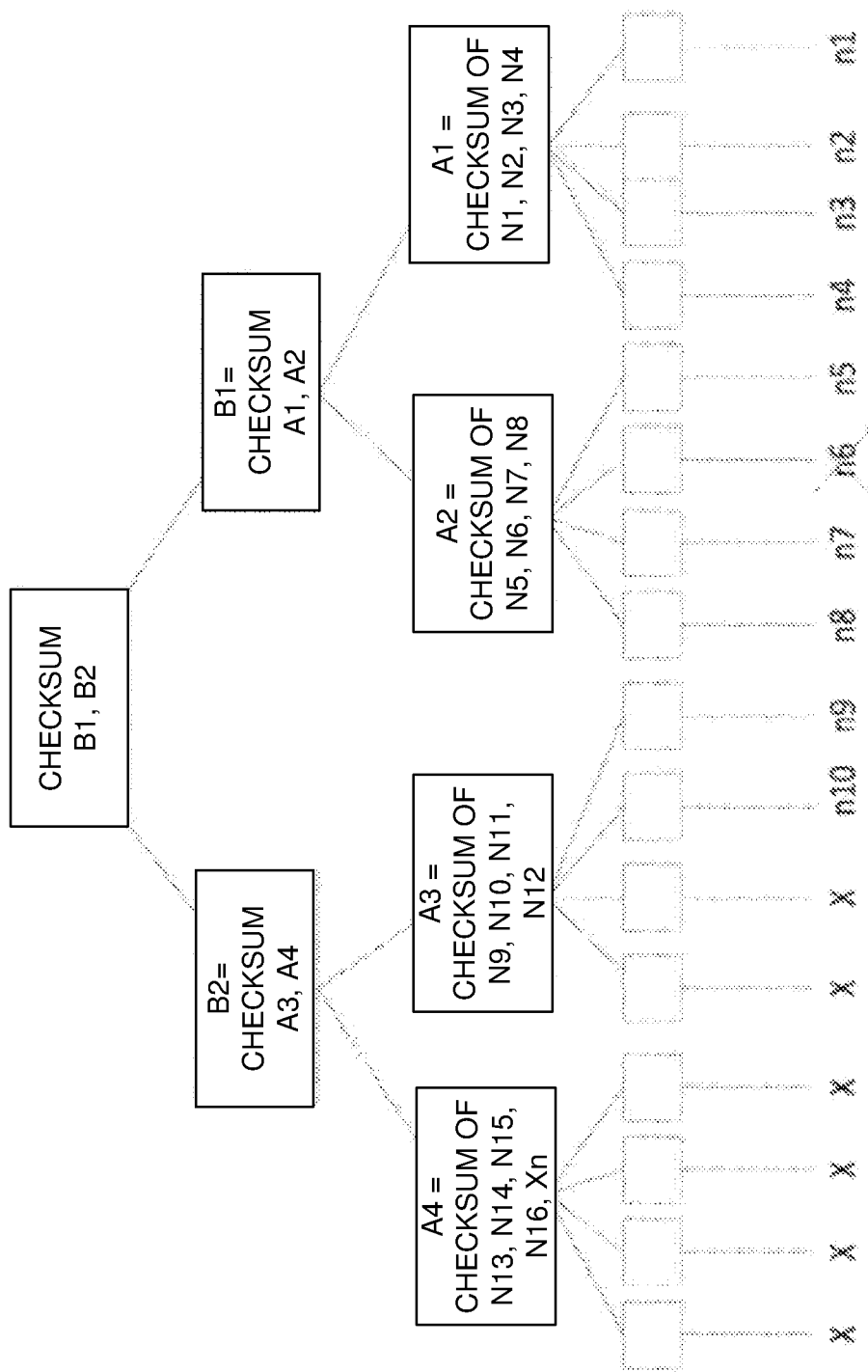
FIG. 14 is a schematic diagram illustrating a fault detection method.

With reference to FIGS. 13-14, in a fault detection method the data structure store management system 100 selects a data structure to which the method will be applied, step 810. By way of example, the data structure store management computing system 100 can select the data structure based on an input from a user, although the data structure store management computing system 100 can select the data structure based on other parameters and techniques.

Next, the data structure store management system 100 calculates a checksum for each element within the data structure, step 820. The data structure store management system 100 may calculate the checksum using any conventional algorithm.

In storage step 830, the data structure store management system 100 saves the calculated checksum for each of the data elements. The checksums may be stored separately from the selected data structure, e.g. in the metadata associated with the data structure and stored at the data structure store management system 100.

Alternatively, the data structure store management system 100 can embed a calculated checksum in another element within the same data structure. In the example illustrated in FIG. 14, the data structure store management system 100 stores child checksums for each element n1, n2, . . . in the linked list 'n' at the leaf layer of the tree. The child checksums are concatenated and saved in the non-leaf parent node A1, A2, . . . . The parental nodes A1, A2, etc. may have separate entries in the metadata of the data structure, or may be mapped into the data elements. By way of example only, the metadata related to the data element n1 may include checksums for n1 itself, for the parental node A1, then for B1, and the top level checksum, whereas the metadata associated with node n2 includes only the n2 checksum. The stored checksums enable the data structure store management system 100 to effectively narrow down and identify the scope of the fault from the full structure level checksum at the root to the leaf nodes, n6 in the example of FIG. 14.

When the data structure store management system 100 receives a request to read or edit data in the data structure, step 840 in FIG. 13 the data structure store management system 100 again calculates the top checksum for the requested data, step 850.

Next, the data structure store management system 100 compares the newly calculated checksum with the previously calculated checksum to determine if the data to be read may have been corrupted, step 860. Based on the comparison, if the data structure store management system 100 determines that the newly calculated checksum is equal to the previously calculated checksum, then the data structure store management computing system 100 provides access to the data stored in the data structure, e.g. for reading or editing, step 870, or returns the data. However, if the data structure store management system 100 determines that the newly calculated checksum is different from the previously calculated checksum, then the data structure store management system 100 identifies a fault in the data and may issue a notification, step 880.

When the corrupted data element is identified, the data structure store management system 100 may continue reading the data structure, e.g. using the techniques disclosed with reference to FIGS. 10 and 11, or with reference to FIG. 5A. The missed data may be restored due to the techniques used when the data was stored, e.g. the EC method disclosed above with reference to FIG. 4, or the XOR technique disclosed above with reference to FIG. 12, or the simple duplication illustrated in FIG. 5A.

Accordingly, the fault protection methods disclosed with reference to FIGS. 13-14, 10-11, and 5A employ additional references connecting one element of the data structure to at least two other elements for maintaining the integrity of the data within the data structure.

Although examples of the data structure store management computing system 100 and the plurality of client computing devices are described herein, each of these systems can be implemented on any suitable computer system or computing device.

It is to be understood that the devices and systems of the examples described herein are for exemplary purposes, as many variations of the specific hardware and software used to implement the examples are possible.

In addition to the embodiments described above, the features of the data structure store and the method disclosed in different embodiments may be combined unless two particular features are mutually exclusive. In one embodiment, the method described herein may include backup of a data structure to a block-access permanent storage, such as an HDD or a solid state drive (SSD).

The method presented in the instant disclosure may be embodied in a non-transitory machine readable medium having stored thereon instructions for performing one or more aspects of the present technology as described herein, wherein the instructions when executed by a processor, cause the processor to carry out the steps necessary to implement at least some of the aspects of the methods and the examples, as described and illustrated herein.

What is claimed:

1. A method, executed by a processor utilizing instructions stored within memory, comprising:
    scan, by a data structure store management system, data structures to identify access rates of clients accessing the data structures, wherein a data structure is classified as a cold data structure based upon an access rate of the data structure being below a first threshold or is classified as a hot data structure based upon the access rate of the data structure exceeding a second threshold;
    in response to determining that operations to a first data structure will be read-mostly, convert data within the first data structure into a succinct version of the first data structure, wherein the first data structure is classified as a first cold data structure;
    compress data of a set of data structures identified as cold data structures to create compressed data; and
    provide the clients with access to the compressed data of the cold data structures and access to uncompressed data of the hot data structures.

2. The method of claim 1, comprising:
    selecting a compression algorithm for compressing the data based upon a type of the data stored in the cold data structures, wherein an encoding scheme is selected as the compression algorithm based upon the cold data structures storing a linked list including elements of a string data type.

3. The method of claim 1, comprising:
    in response to the cold data structure comprising a linked list of elements having a string data type, selecting a compression algorithm for compressing the cold data structure based upon the compression algorithm being tailored for compressing data having the string data type.

4. The method of claim 1, comprising:
    monitoring access to the cold data structure whose data is compressed as the compressed data to determine a current access rate to the cold data structure; and
    in response to the current access rate indicating an access rate change exceeding the second threshold:
        decompressing the compressed data to create uncompressed data;
        modifying a classification of the data structure from being the cold data structure to being the hot data structure; and
        providing the clients with access to the uncompressed data of the hot data structure.

5. The method of claim 1, comprising:
    selecting a compression algorithm based upon a cold data structure comprising a tree data structure associated with a fanout type of metadata.

6. The method of claim 1, comprising:
    classifying the data structure as either being the cold data structure or the hot data structure based upon at least one of a type or a size of data stored within the data structure.

7. The method of claim 1, comprising:
    classifying a first portion of the data structure as being the cold data structure and a second portion of the data structure as being the hot data structure.

8. The method of claim 1, wherein the data structure comprises a stack data structure, and the method comprising:
    classifying a top set of elements of the stack data structure as being the hot data structure and remaining elements of the stack data structure as being the cold data structure.

9. The method of claim 1, comprising:
classifying the data structure as being a warm data structure based upon the access rate of the data structure being between the first threshold and the second threshold.

10. The method of claim 1, wherein the data structure is a sub-tree of a binary tree, and wherein the method comprises:
converting data of the sub-tree into a succinct binary tree.

11. The method of claim 1, comprising:
utilizing non-volatile memory to enable an application to request persistence of the data structure during computation, wherein byte addressable access is provided to the data structure.

12. The method of claim 1, comprising:
performing deduplication upon the data structures utilizing a chunk size and boundaries that are aware of hidden patterns.

13. The method of claim 1, comprising:
in response to determining that the data structure is a binary tree with a low access count below the first threshold and is marked as ready only, convert the binary tree into a succinct binary tree.

14. The method of claim 1, comprising:
in response to determining that the data structure is a sub-tree of a binary tree with a low access count below the first threshold and is marked as ready only, convert the binary tree into a succinct binary tree.

15. The method of claim 1, comprising:
implementing a metadata API to support querying, setting, and resetting metadata attributes for the data structures.

16. A non-transitory machine readable medium comprising instructions for performing a method, which when executed by a machine, causes the machine to:
scan, by a data structure store management system, data structures to identify access rates of clients accessing the data structures, wherein a data structure is classified as a cold data structure based upon an access rate of the data structure being below a first threshold or is classified as a hot data structure based upon the access rate of the data structure exceeding a second threshold;
in response to determining that a majority of operations to a first data structure will be read-mostly, convert data within the first data structure into a succinct version of the first data structure, wherein the first data structure is classified as a first cold data structure;
compress data of a set of data structures identified as cold data structures to create compressed data; and
provide the clients with access to the compressed data of the cold data structures and access to uncompressed data of the hot data structures.

17. The non-transitory machine readable medium of claim 16, wherein the instructions cause the machine to:
select a compression algorithm for compressing the data based upon a type of the data stored in the cold data structures.

18. The non-transitory machine readable medium of claim 16, wherein the instructions cause the machine to:
in response to the cold data structure comprising a linked list of elements having a string data type, select a compression algorithm for compressing the cold data structure based upon the compression algorithm being tailored for compressing data having the string data type.

19. The non-transitory machine readable medium of claim 16, wherein the instructions cause the machine to:
monitor access to the cold data structure whose data was compressed as the compressed data to determine a current access rate to the cold data structure; and
in response to the current access rate indicating an access rate change exceeding the second threshold:
decompress the compressed data to create uncompressed data;
modify a classification of the data structure from being the cold data structure to being the hot data structure; and
provide the clients with access to the uncompressed data of the hot data structure.

20. A computing device comprising:
a memory comprising machine executable code; and
a processor coupled to the memory, the processor configured to execute the machine executable code to cause the processor to:
scan, by a data structure store management system, data structures to identify access rates of clients accessing the data structures, wherein a data structure is classified as a cold data structure based upon an access rate of the data structure being below a first threshold or is classified as a hot data structure based upon the access rate of the data structure exceeding a second threshold;
in response to determining that the data structure is a binary tree with a low access count below the first threshold and is marked as ready only, convert the binary tree into a succinct binary tree marked as a cold data structure;
compress data of a set of data structures identified as cold data structures to create compressed data; and
provide the clients with access to the compressed data of the cold data structures and access to uncompressed data of the hot data structures.

21. A non-transitory machine readable medium comprising instructions for performing a method, which when executed by a machine, causes the machine to:
scan, by a data structure store management system, data structures to identify access rates of clients accessing the data structures, wherein a data structure is classified as a cold data structure based upon an access rate of the data structure being below a first threshold or the data structure is classified as a hot data structure based upon the access rate of the data structure exceeding a second threshold;
in response to determining that the data structure is a sub-tree of a binary tree with a low access count below the first threshold and is marked as ready only, convert the binary tree into a succinct binary tree marked as a cold data structure;
compress data of a set of data structures identified as cold data structures to create compressed data; and
provide the clients with access to the compressed data of the cold data structures and access to uncompressed data of the hot data structures.

22. A non-transitory machine readable medium comprising instructions for performing a method, which when executed by a machine, causes the machine to:
scan, by a data structure store management system, data structures to identify access rates of clients accessing the data structures, wherein a data structure is classified as a cold data structure based upon an access rate of the data structure being below a first threshold or the data structure is classified as a hot data structure based upon the access rate of the data structure exceeding a second threshold, and wherein a top set of elements of a stack data structure are classified as being the hot data structure and remaining elements of the stack data structure are classified as being the cold data structure;

compress data of a set of data structures identified as cold data structures to create compressed data; and provide the clients with access to the compressed data of the cold data structures and access to uncompressed data of the hot data structures.

* * * * *